(12) United States Patent
Xie et al.

(10) Patent No.: US 9,832,139 B2
(45) Date of Patent: Nov. 28, 2017

(54) METHOD AND SYSTEM FOR ACCESSING NETWORK SERVICE

(71) Applicant: TENCENT TECHNOLOGY (SHENZHEN) COMPANY LIMITED, Guangdong (CN)

(72) Inventors: Ming Xie, Guangdong (CN); Yue Wu, Guangdong (CN); Wenzheng Li, Guangdong (CN); Zhiwu Chen, Guangdong (CN); Gang Wang, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 461 days.

(21) Appl. No.: 14/521,254

(22) Filed: Oct. 22, 2014

(65) Prior Publication Data
US 2015/0039762 A1    Feb. 5, 2015

Related U.S. Application Data

(63) Continuation of application No. PCT/CN2013/073689, filed on Apr. 3, 2013.

(30) Foreign Application Priority Data

Apr. 23, 2012 (CN) .......................... 2012 1 0120211

(51) Int. Cl.
*G06F 15/177* (2006.01)
*H04L 12/927* (2013.01)
(Continued)

(52) U.S. Cl.
CPC ............ *H04L 47/803* (2013.01); *H04L 67/02* (2013.01); *H04L 67/16* (2013.01); *H04W 48/18* (2013.01);
(Continued)

(58) Field of Classification Search
USPC ........................................................ 709/220
See application file for complete search history.

(56) References Cited

U.S. PATENT DOCUMENTS 6,195,356 B1 * 2/2001 Anello .................. H04L 12/462
370/398
6,249,801 B1 * 6/2001 Zisapel ................... G06F 9/505
718/105

(Continued)

FOREIGN PATENT DOCUMENTS

CN    1512707 A    7/2004
CN    1863143 A    11/2006
(Continued)

OTHER PUBLICATIONS

Zheng, L. et al., Network Acceleration Technology based on Peer-to-Peer Network, Sep. 20, 2010, IEEE, 2010 3rd International Conference on Advanced Computer Theory and Engineering (ICACTE), pp. V5-403-V5-407.*
(Continued)

*Primary Examiner* — Alicia Baturay
(74) *Attorney, Agent, or Firm* — Knobbe Martens Olson & Bear LLP

(57) ABSTRACT

According to an example, a web server receives an access request from one operator network of different operator networks, process the access request, and obtain processing data. The web server determines an output VIP address corresponding to an input VIP address carried in the access request according to a relationship between input VIP addresses and output VIP addresses of VS clusters of the different operator networks, and sends the processing data to a VS cluster indicated by the output VIP address via an internal network. The VS cluster selects one VS, and the VS selected sends the processing data to a user terminal via an external network.

12 Claims, 2 Drawing Sheets

(51) Int. Cl.
*H04L 29/08* (2006.01)
*H04W 48/18* (2009.01)
*H04L 29/12* (2006.01)
*H04W 48/14* (2009.01)

(52) U.S. Cl.
CPC ....... *H04L 61/1511* (2013.01); *H04L 61/2007* (2013.01); *H04W 48/14* (2013.01)

(56) References Cited

U.S. PATENT DOCUMENTS

| | | | | |
|---|---|---|---|---|
| 6,442,616 | B1 * | 8/2002 | Inoue | H04L 29/12311 455/432.1 |
| 6,665,702 | B1 * | 12/2003 | Zisapel | G06F 9/505 709/223 |
| 6,691,165 | B1 * | 2/2004 | Bruck | H04L 29/12009 709/227 |
| 6,718,359 | B2 * | 4/2004 | Zisapel | G06F 9/505 709/238 |
| 6,801,949 | B1 * | 10/2004 | Bruck | H04L 29/12009 709/232 |
| 6,965,946 | B2 * | 11/2005 | Inoue | H04L 29/12311 455/432.1 |
| 7,146,417 | B1 * | 12/2006 | Coile | H01R 31/005 709/224 |
| 7,305,429 | B2 * | 12/2007 | Borella | H04L 29/06 455/433 |
| 7,577,439 | B2 * | 8/2009 | Halonen | H04W 16/00 370/315 |
| 7,599,941 | B2 * | 10/2009 | Bahar | G06F 9/5011 |
| 7,613,827 | B2 * | 11/2009 | Bruck | H04L 29/12216 709/201 |
| 7,730,190 | B2 * | 6/2010 | Coile | H01R 31/005 709/227 |
| 7,949,785 | B2 * | 5/2011 | Alkhatib | G06Q 10/109 709/245 |
| 7,984,148 | B2 * | 7/2011 | Zisapel | G06F 9/505 709/224 |
| 8,451,797 | B2 * | 5/2013 | Buddhikot | H04L 29/12358 370/331 |
| 8,521,890 | B2 * | 8/2013 | Bailey | H04L 41/04 709/227 |
| 9,237,194 | B2 * | 1/2016 | Davis | H04L 41/0806 |
| 2002/0186698 | A1 * | 12/2002 | Ceniza | H04L 12/4641 370/401 |
| 2004/0260821 | A1 | 12/2004 | Yamamoto et al. | |
| 2009/0089406 | A1 | 4/2009 | Roush et al. | |
| 2010/0095008 | A1 * | 4/2010 | Joshi | H04L 29/12066 709/228 |
| 2014/0012995 | A1 | 1/2014 | Zhang | |

FOREIGN PATENT DOCUMENTS

| | | |
|---|---|---|
| CN | 1917436 A | 2/2007 |
| CN | 101971147 A | 2/2011 |
| CN | 102137014 A | 7/2011 |
| CN | 102299969 A | 12/2011 |
| EP | 1903742 A1 | 3/2008 |

OTHER PUBLICATIONS

International Search Report for PCT/CN2013/073689 dated Jul. 18, 2013, 2 pages.
Office Action issued in Chinese Patent Application No. 201210120211.X, dated Oct. 29, 2015.
Office Action Issued in Chinese Patent Application No. 201210120211X, dated Jul. 31, 2015.
Shen, The Application of Reverse Agent Technology in Campus Network, Computer Knowledge and Technology, vol. 7, No. 29, Oct. 2011, in 2 pages.
International Preliminary Report and Written Opinion of the International Searching Authority for International Application No. PCT/CN2013/073689, dated Jul. 18, 2013, in 21 pages.

* cited by examiner

METHOD AND SYSTEM FOR ACCESSING NETWORK SERVICE

CROSS-REFERENCES TO RELATED APPLICATIONS

This application is a continuation of International Application No. PCT/CN2013/073689, filed on Apr. 3, 2013, which claims priority to Chinese Patent Application No. 201210120211.X, filed on Apr. 23, 2012, the entire contents of all of which are incorporated herein by reference in their entirety for all purposes.

TECHNICAL FIELD

The present disclosure relates to network transmission technologies, and more particularly, to a method and system for accessing a network service.

BACKGROUND

In order to provide a same network service to user terminals of different operator networks, each operator network is configured with a web server, and the web server is a Real Server (RS) that provides services actually.

In conventional solutions for accessing the network service, the web server receives and processes an access request, and sends processing data to the user terminal directly via an external network, or a proxy server sends the processing data to the user terminal via the external network. Hence, lots of external network IP addresses are used and external network resources are wasted.

SUMMARY

Examples of the present disclosure provides a method and a system for accessing a network service, so as to reduce the number of used external network IPs and save external network resources.

A method for accessing a network service includes:

receiving, by a web server, an access request from one operator network of different operator networks; processing the access request; and obtaining processing data;

determining, by the web server, an output Virtual IP (VIP) address corresponding to an input VIP address carried in the access request according to a relationship between input VIP addresses and output VIP addresses of Virtual Server (VS) clusters of the different operator networks; and sending the processing data to a VS cluster indicated by the output VIP address via an internal network;

selecting, a VS from the VS cluster; and sending, by the VS selected, the processing data to a user terminal via an external network.

A system for accessing a network service includes a VS cluster of a first operator network, a VS cluster of a second operator network and a web server of the first operator network;

the web server of the first operator network is configured to receive an access request from the first operator network or the second operator network; process the access request; obtain processing data; determine an output Virtual IP (VIP) address corresponding to an input VIP address carried in the access request according to a relationship between input VIP addresses and output VIP addresses of Virtual Server (VS) clusters of the first operator network and the second operator network; and send the processing data to a VS cluster indicated by the output VIP address via an internal network;

the VS cluster of the first operator network is configured to, when the VS cluster indicated by the output VIP address is the VS cluster of the first operator network, receive the processing data sent by the web server of the first operator network via the internal network and select a VS; the VS selected is to send the processing data to a user terminal of the first operator network via an external network; and the VS cluster of the second operator network is configured to, when the VS cluster indicated by the output VIP address is the VS cluster of the second operator network, receive the processing data sent by the web server of the first operator network via the internal network and select a VS; the VS selected is to send the processing data to a user terminal of the second operator network via an external network.

A method for accessing a network service includes:

receiving, by a web server, an access request from one operator network of different operator networks; processing the access request; and obtaining processing data;

determining, by the web server, an output Virtual IP (VIP) address corresponding to an input VIP address carried in the access request according to a relationship between input VIP addresses and output VIP addresses of Virtual Server (VS) clusters of the different operator networks; and sending the processing data to a VS cluster indicated by the output VIP address via an internal network for sending the processing data to a user terminal.

As can be seen from the above technical solutions, the web server receives the access request from one operator network of different operator networks, processes the access request to obtain processing data, and sends the processing data to the VS cluster of a corresponding operator network via the internal network. The VS cluster sends the processing data to the user terminal via the external network, thereby avoiding the case that the web server transmits the processing data to the user terminal directly via the external network. Although one VS cluster corresponds to multiple web servers, one VS cluster only needs to be assigned with one external network IP, i.e. the output VIP address, thereby reducing the external network IP addresses to be used and saving external network resources.

DETAILED DESCRIPTION

Figure 1:
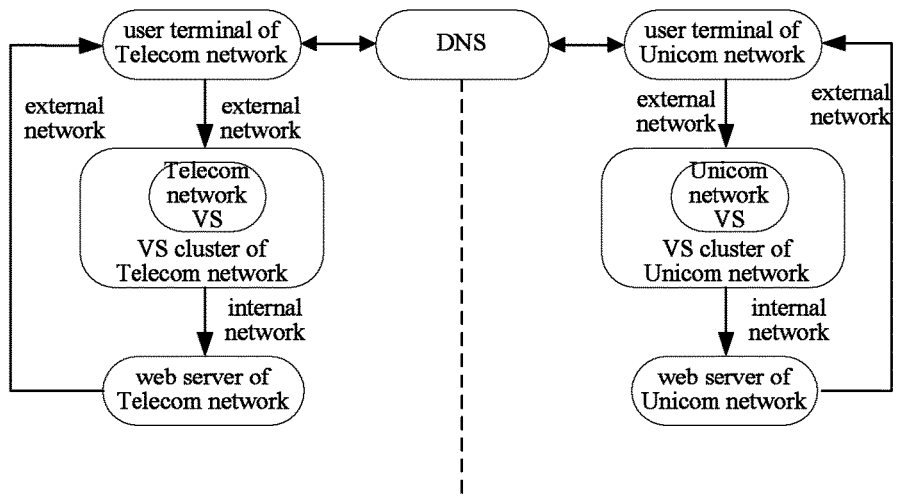
FIG. 1 is a schematic diagram illustrating a conventional system for accessing a network service.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various examples given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The description will be made as to the examples of the present disclosure in conjunction with the accompanying drawings in FIGS. 1-4. It should be understood that specific examples described herein are merely intended to explain the present disclosure, but not intended to limit the present disclosure. In accordance with the purposes of this disclosure, as embodied and broadly described herein, this disclosure, in one aspect, relates to method and system for accessing a network service.

Examples of mobile terminals that can be used in accordance with various examples include, but are not limited to, a tablet PC (including, but not limited to, Apple iPad and other touch-screen devices running Apple iOS, Microsoft Surface and other touch-screen devices running the Windows operating system, and tablet devices running the Android operating system), a mobile phone, a smartphone (including, but not limited to, an Apple iPhone, a Windows Phone and other smartphones running Windows Mobile or Pocket PC operating systems, and smartphones running the Android operating system, the Blackberry operating system, or the Symbian operating system), an e-reader (including, but not limited to, Amazon Kindle and Barnes & Noble Nook), a laptop computer (including, but not limited to, computers running Apple Mac operating system, Windows operating system, Android operating system and/or Google Chrome operating system), or an on-vehicle device running any of the above-mentioned operating systems or any other operating systems, all of which are well known to those skilled in the art.

FIG. 1 is a schematic diagram illustrating a conventional system for accessing a network service. The system includes two different operator networks: Telecom network and Unicom network. As shown in FIG. 1, the system includes a Domain Name Service (DNS), a user terminal of the Telecom network, a Virtual Server (VS) cluster of the Telecom network, a web server of the Telecom network, a user terminal of the Unicom network, a VS cluster of the Unicom network and a web server of the Unicom network. In FIG. 1, equipment structures of the Telecom network are shown in the left of the dashed line, and equipment structures of the Unicom network are shown in the right of the dashed line. The DNS receives a domain name resolution request sent by the user terminal of the Telecom network or the Unicom network, resolves a domain name to obtain an input Virtual IP (VIP) address, and sends the input VIP address to the user terminal, The input VIP address indicates the VS cluster of the network to which the user terminal belong.

Thereafter, the user terminal of the Telecom network, by using the input VIP, sends an access request to the VS cluster of the Telecom network via an external network, and the user terminal of the Unicom network, by using the input VIP, sends an access request to the VS cluster of the Unicom network via an external network.

Generally, one VS cluster corresponds to multiple web servers, and data communications are performed between the VS cluster and the web servers via an internal local area network. After receiving the access request, the VS cluster selects a VS, and the selected VS sends the access request to a web server of a corresponding operator network for further processing. Specifically, the VS of the Telecom network sends the access request to the web server of the Telecom network via an internal network, and the VS of the Unicom network sends the access request to the web server of the Unicom network via an internal network.

The web server processes the access request, obtains processing data, and sends the processing data to the user terminal via the external network. Specifically, the web server of the Telecom network sends the processing data to the user terminal of the Telecom network via the external network, and the web server of the Unicom network sends the processing data to the user terminal of the Unicom network via the external network.

By using the system in FIG. 1, when maintaining data of the same network service, data synchronization needs to be performed for the web server of the Telecom network and the web server of the Unicom network, which wastes some overhead. Furthermore, the user terminal of the Telecom network cannot access the web server of the Unicom network, and the user terminal of the Unicom network cannot access the web server of the Telecom network. Hence, a cross-network service is not available.

Figure 2:
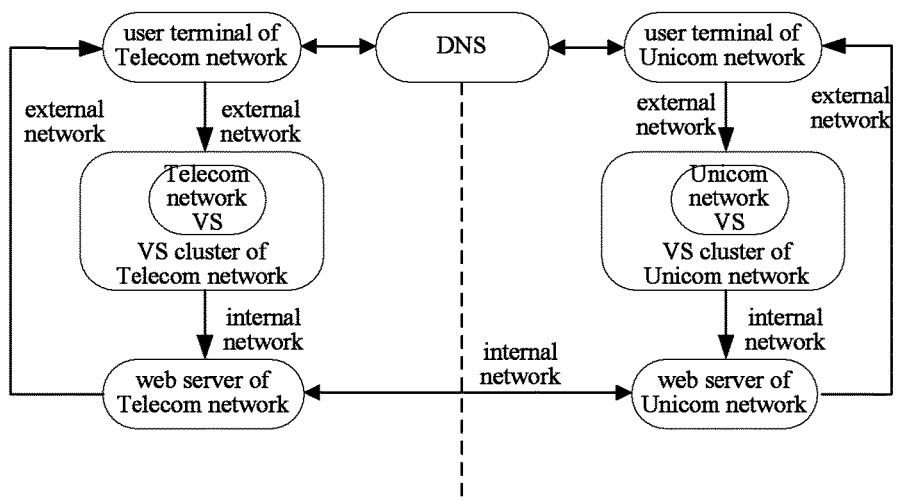
FIG. 2 is a schematic diagram illustrating another conventional system for accessing a network service.

In order to save the synchronization overhead and achieve the cross-network service, a system shown in FIG. 2 is widely used when accessing the network service. In FIG. 2, the web server of the Unicom network is replaced by a proxy server. The proxy server receives the access request from the VS cluster of the Unicom network, and transmits the access request to the web server of the Telecom network via the internal network. The web server of the Telecom network processes the access request, and sends a result to the proxy server. The proxy server sends the result to the user terminal via the external network.

Generally, in the operator network, multiple web servers provide services of the same network service to the users. For example, in order to provide a game service, about 100 web servers are needed, and an external network IP is assigned to each web server for sending the processing data to the user. In addition, each proxy server corresponds to a web server, and an external network IP is assigned to each proxy server for sending processing data to the user. Therefore, multiple web servers and multiple proxy servers occupy a lot of external network IPs.

In FIGS. 1 and 2, the Telecom network and the Unicom network are taken as examples. In practical applications, other networks, such as Education Network, mobile network, small and medium-sized operator networks, also suffer the above problems when the network service is accessed.

According to various examples of the present disclosure, processing data to be sent to a user terminal by a web server is sent to a VS cluster via an internal network firstly, and then the VS cluster sends the processing data to the user terminal via an external network, thereby saving external network resources.

Figure 3:
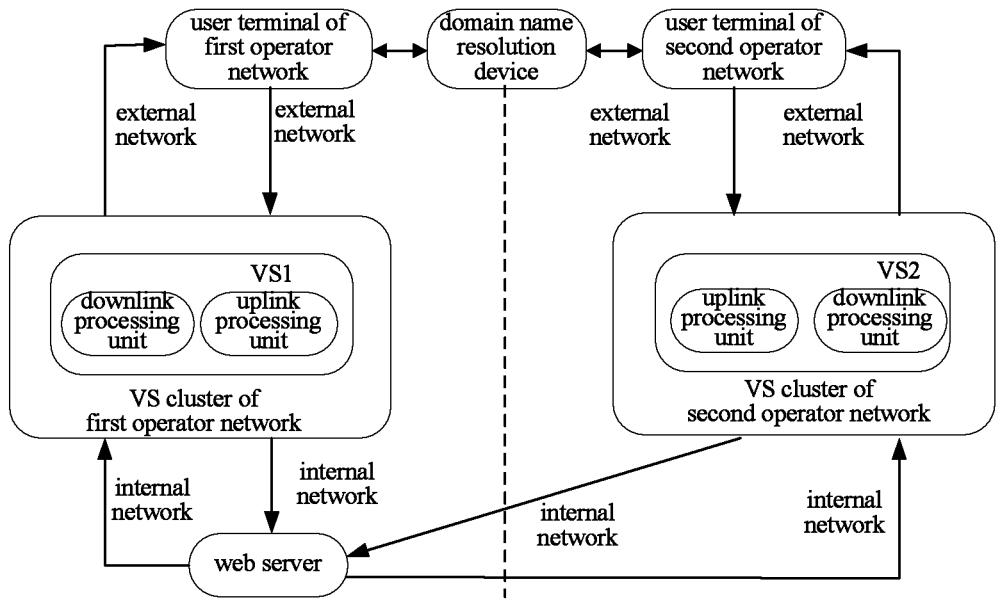
FIG. 3 is a schematic diagram illustrating a system for accessing a network service according to various examples of the present disclosure.

FIG. 3 is a schematic diagram illustrating a system for accessing a network service according to various examples of the present disclosure. As shown in FIG. 3, the system includes a VS cluster of a first operator network, a VS cluster of a second operator network and a web server of the first operator network.

The web server of the first operator network is to preset a relationship between input VIP addresses and output VIP addresses of each VS cluster of the operator network. The web server of the first operator network is to receive an access request from the first operator network or the second operator network, process the access request, obtain processing data, determines an output VIP address corresponding to an input VIP address carried in the access request according to the relationship, and send the processing data to a VS cluster indicated by the output VIP address via an internal network.

When the VS cluster indicated by the output VIP address is the VS cluster of the first operator network, the VS cluster of the first operator network is to receive the processing data sent by the web server of the first operator network via the internal network, and select a VS. The selected VS sends the processing data to a user terminal of the first operator network via an external network.

When the VS cluster indicated by the output VIP address is the VS cluster of the second operator network, the VS cluster of the second operator network is to receive the processing data sent by the web server of the first operator network via the internal network, and select a VS. The selected VS sends the processing data to a user terminal of the second operator network via an external network.

According to an example, the system may further include a domain name resolution device.

The domain name resolution device is to receive a domain name resolution request from the user terminal of the first operator network, perform domain name resolution, and send resolved input VIP address to the user terminal of the first operator network.

The domain name resolution device is to receive a domain name resolution request from the user terminal of the second operator network, perform domain name resolution, and send resolved input VIP address to the user terminal of the second operator network.

The user terminal of the first operator network receives the input VIP address from the domain name resolution device, and sends, according to the received input VIP address, an access request carrying the input VIP address to the VS cluster of the first operator network corresponding to the input VIP address via the external network.

The user terminal of the second operator network receives the input VIP address from the domain name resolution device, and sends, according to the received input VIP address, an access request carrying the input VIP address to the VS cluster of the second operator network corresponding to the input VIP address via the external network.

The VS cluster of the first operator network is further to receive the access request sent by the user terminal of the first operator network via the external network and select a VS. The selected VS sends the access request to the web server of the first operator network via the internal network.

The VS cluster of the second operator network is further to receive the access request sent by the user terminal of the second operator network via the external network and select a VS. The selected VS sends the access request to the web server of the first operator network via the internal network.

The input VIP address resolved by the domain name resolution device indicates the VS cluster of the operator network to which the user terminal belongs.

The VS cluster includes multiple VSs, and each VS has an uplink processing unit and a downlink processing unit.

After receiving the access request from the user terminal, the VS cluster selects a VS for forwarding the access request. After receiving the processing data from the web server, the VS cluster selects a VS for forwarding the processing data. The VS for forwarding the processing data and the VS for forwarding the access request may be the same VS, or may be different VSs. In FIG. 3, the VS for forwarding the processing data and the VS for forwarding the access request may be the same VS, i.e., the first operator network selects VS1 for forwarding both the processing data and the access request, and the second operator network selects VS2 for forwarding both the processing data and the access request.

The downlink processing unit in the VS is to forward the processing data from the web server to the user terminal, and the uplink processing unit is to forward the access request from the user terminal to the web server.

The VS cluster has an input VIP address and an output VIP address. The input VIP address is used to communicate with the internal network, and the output VIP address is used to communicate with the external network. When forwarding is needed, the VS cluster may select a VS according to conventional selecting modes, which is not described in detail herein.

According to an example, the domain name resolution device may be a DNS.

The first operator network and the second operator network are two different networks. For example, the first operator network is a Telecom network and the second operator network is a Unicom network, an Education network, a mobile network or a small or medium-sized operator network, and etc.

According to various examples of the present disclosure, the web server receives access requests from different operator networks, processes the access requests and then sends processing data to the VS cluster of the network corresponding to the access request via the internal network. The VS cluster sends the processing data to the user terminal via the external network, therefore avoiding the case that the web server transmits the processing data to the user terminal directly via the external network. Since one VS cluster corresponds to multiple web servers, one VS cluster in the examples of the present disclosure only needs to be assigned with one external network IP address, i.e. the output VIP address, thereby reducing the external network IP addresses to be used and saving external network resources. In addition, when the web server transmits the processing data to the user terminal directly via the external network, the web server is exposed to the external network, which causes security risks. By using the solutions of the present disclosure, the internal network and the external network work together to send the processing data, therefore, improving the security of the web server.

In FIG. 3, the VS cluster receives the access request and selects one VS. The selected VS forwards the access request to the web server of the first operator network, receives the processing data sent by the web server of the first operator network and feeds sends the processing data to the user terminal. The VS may be regarded as a server which directly processes the access request, and such a proxy manner is called a reverse proxy. Since the VS in FIG. 3 processes data of a network layer, such a reverse proxy is also called network layer reverse proxy.

Figure 4:
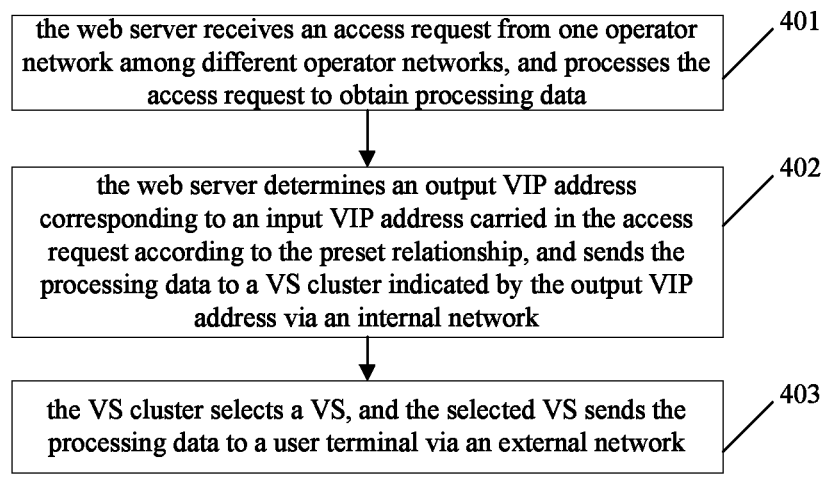
FIG. 4 is a schematic flowchart illustrating a method for accessing a network service according to various examples of the present disclosure.

FIG. 4 is a schematic flowchart illustrating a method for accessing a network service according to various examples of the present disclosure.

According to an example, a relationship between input VIP addresses and output VIP addresses of each VS cluster of operator networks are preset in a web server. As shown in FIG. 4, the method includes the following processing.

At 401, the web server receives an access request from one operator network among different operator networks, and processes the access request to obtain processing data.

According to an example, different operator networks may be categorized into two kinds of networks, one includes the network including the web server, and the other includes networks not including the web server.

At 402, the web server determines an output VIP address corresponding to an input VIP address carried in the access request according to the preset relationship, and sends the processing data to a VS cluster indicated by the output VIP address via an internal network.

The web server is preconfigured with a policy route, i.e. the relationship between the input VIP addresses and the output VIP addresses of each VS cluster of the operator networks. The web server determines the output VIP address corresponding to the input VIP address, and sends the processing data to the VS cluster indicated by the output VIP address via the internal network.

According to an example, the internal network is a local area network to which the web server belongs.

At 403, the VS cluster selects a VS, and the selected VS sends the processing data to a user terminal via an external network.

FIG. 4 shows a downlink processing procedure. In the downlink processing procedure, the web server receives the access requests from different operator networks, and the processing data is sent to the user terminal finally. Before the web server receives the access request from different operator networks, an uplink processing procedure in which a user terminal sends the access request may as follows.

The domain name resolution device receives a domain name resolution request from the user terminal of one of the different operator networks, resolves the domain name to obtain an input VIP address, and sends the input VIP address to the user terminal. The user terminal, according to the received input VIP address, sends the access request carrying the input VIP address to a VS cluster corresponding to the input VIP address via the external network. The VS cluster selects one VS, and the selected VS sends the received access request to the web server via the internal network.

If the user terminal is a user terminal of a Telecom network, the VS cluster corresponding to the input VIP address is a VS cluster of the Telecom network; if the user terminal is a user terminal of a Unicom network, the VS cluster corresponding to the input VIP address is a VS cluster of the Unicom network; if the user terminal is a user terminal of an Education network, the VS cluster corresponding to the input VIP address is a VS cluster of the Education network; if the user terminal is a user terminal of an mobile network, the VS cluster corresponding to the input VIP address is a VS cluster of the mobile network, and if the user terminal is a user terminal of a small or medium-sized network, the VS cluster corresponding to the input VIP address is a VS cluster of the small or medium-sized network.

In addition, according to various examples of the preset disclosure, the networks are not limited to two operator networks, and there may be three or more than three different operator networks. Correspondingly, three operator networks are configured with three VS clusters respectively, and the three VS clusters correspond to only one web server. The web server may be located in one operator network of the three operator networks, e.g. the Telecom network which is mainly used currently. The specific implementing modes are similar with the above described implementing modes, and will not be described herein.

The methods and modules described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

The foregoing is only preferred examples of the present disclosure and is not used to limit the protection scope of the present disclosure. Any modification, equivalent substitution and improvement are within the protection scope of the present disclosure.

The invention claimed is:

1. A method for accessing a network service, comprising:
receiving, by a web server, an access request from one operator network of different operator networks corresponding to different Virtual Server (VS) clusters respectively; processing the access request; and obtaining processing data;
determining, by the web server, an output Virtual IP (VIP) address corresponding to an input VIP address carried in the access request according to a relationship between input VIP addresses and output VIP addresses of the different VS clusters of the different operator networks; and sending the processing data to a VS cluster indicated by the output VIP address via an internal network;
selecting, by the VS cluster, a VS; and sending, by the VS selected, the processing data to a user terminal via an external network;
wherein,
if the user terminal is a user terminal of a Telecom network, the VS cluster corresponding to the input VIP address is a VS cluster of the Telecom network;
if the user terminal is a user terminal of a Unicom network, the VS cluster corresponding to the input VIP address is a VS cluster of the Unicom network;
if the user terminal is a user terminal of an education network, the VS cluster corresponding to the input VIP address is a VS cluster of the education network;
if the user terminal is a user terminal of an mobile network, the VS cluster corresponding to the input VIP address is a VS cluster of the mobile network; and
if the user terminal is a user terminal of a small or medium-sized network, the VS cluster corresponding to the input VIP address is a VS cluster of the small or medium-sized network.

2. The method of claim 1, before processing the access request, further comprises:
receiving, by a domain name resolution device, a domain name resolution request from the user terminal; performing domain name resolution to obtain the input VIP address ; and sending the input VIP address to the user terminal;
sending, by the user terminal, the access request carrying the input VIP address to a VS cluster corresponding to the input VIP address via the external network;
selecting, by the VS cluster, a VS;
sending, by the VS selected, the access request to the web server via the internal network.

3. The method of claim 1, wherein the web server is located in one operator network of the different operator networks.

4. A system for accessing a network service, comprising: a VS cluster of a first operator network, a VS cluster of a second operator network and a web server of the first operator network; wherein
the web server of the first operator network is configured to receive an access request from the first operator network or the second operator network; process the access request; obtain processing data; determine an output Virtual IP (VIP) address corresponding to an input VIP address carried in the access request according to a relationship between input VIP addresses and output VIP addresses of Virtual Server (VS) clusters of the first operator network and the second operator network; and send the processing data to a VS cluster indicated by the output VIP address via an internal network;
the VS cluster of the first operator network is configured to, when the VS cluster indicated by the output VIP address is the VS cluster of the first operator network, receive the processing data sent by the web server of the first operator network via the internal network and select a VS;
the VS selected is configured to send the processing data to a user terminal of the first operator network via an external network; and
the VS cluster of the second operator network is configured to, when the VS cluster indicated by the output VIP address is the VS cluster of the second operator network, receive the processing data sent by the web server of the first operator network via the internal network and select a VS; the VS selected is configured to send the processing data to a user terminal of the second operator network via an external network;
wherein,
if the user terminal is a user terminal of a Telecom network, the VS cluster corresponding to the input VIP address is a VS cluster of the Telecom network;
if the user terminal is a user terminal of a Unicom network, the VS cluster corresponding to the input VIP address is a VS cluster of the Unicom network;
if the user terminal is a user terminal of an education network, the VS cluster corresponding to the input VIP address is a VS cluster of the education network;
if the user terminal is a user terminal of an mobile network, the VS cluster corresponding to the input VIP address is a VS cluster of the mobile network; and if the user terminal is a user terminal of a small or medium-sized network, the VS cluster corresponding to the input VIP address is a VS cluster of the small or medium-sized network.

5. The system of claim 4, further comprising:

a domain name resolution device, configured to receive a domain name resolution request from the user terminal of the first operator network; perform domain name resolution to obtain the input VIP address; and send the input VIP address to the user terminal of the first operator network; or to receive a domain name resolution request from the user terminal of the second operator network; perform domain name resolution to obtain the input VIP address; and send the input VIP address to the user terminal of the second operator network;

wherein the user terminal of the first operator network is configured to receive the input VIP address sent by the domain name resolution device, and send the access request carrying the input VIP address to the VS cluster of the first operator network corresponding to the input VIP address; and the user terminal of the second operator network is configured to receive the input VIP address sent by the domain name resolution device, and send the access request carrying the input VIP address to the VS cluster of the second operator network corresponding to the input VIP address.

6. The system of claim 5, wherein, the VS cluster of the first operator network is further configured to receive the access request sent by the user terminal of the first operator network via the external network, select a VS, and the selected VS is configured to send the access request to the web server of the first operator network via the internal network; and the VS cluster of the second operator network is further configured to receive the access request sent by the user terminal of the second operator network via the external network, select a VS, and the selected VS is configured to send the access request to the web server of the first operator network via the internal network.

7. The system of claim 5, wherein the domain name resolution device is a domain name server.

8. The system of claim 4, wherein the web server of the first operator network is located in the first operator network.

9. The system of claim 4, wherein the web server of the first operator network is located in the second operator network.

10. The system of claim 4, wherein the system comprises one first operator network and at least one second operator network.

11. A method for accessing a network service, comprising:

receiving, by a web server, an access request from one operator network of different operator networks corresponding to different Virtual Server (VS) clusters respectively; processing the access request; and obtaining processing data;

determining, by the web server, an output Virtual IP (VIP) address corresponding to an input VIP address carried in the access request according to a relationship between input VIP addresses and output VIP addresses of the different VS clusters of the different operator networks; and sending the processing data to a VS cluster indicated by the output VIP address via an internal network for sending the processing data to a user terminal;

wherein, if the user terminal is a user terminal of a Telecom network, the VS cluster corresponding to the input VIP address is a VS cluster of the Telecom network;

if the user terminal is a user terminal of a Unicom network, the VS cluster corresponding to the input VIP address is a VS cluster of the Unicom network;

if the user terminal is a user terminal of an education network, the VS cluster corresponding to the input VIP address is a VS cluster of the education network;

if the user terminal is a user terminal of an mobile network, the VS cluster corresponding to the input VIP address is a VS cluster of the mobile network; and if the user terminal is a user terminal of a small or medium-sized network, the VS cluster corresponding to the input VIP address is a VS cluster of the small or medium-sized network.

12. The method of claim 11, wherein the web server is located in one operator network of the different operator networks.

* * * * *